(12) United States Patent
Danielli et al.

(10) Patent No.: US 6,449,861 B1
(45) Date of Patent: Sep. 17, 2002

(54) HEAD FOR CHECKING LINEAR DIMENSIONS OF PARTS

(75) Inventors: Franco Danielli, Zola Predosa; Carlo Carli, Ferrara, both of (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 09/262,120

(22) Filed: Mar. 4, 1999

(30) Foreign Application Priority Data

Apr. 6, 1998 (IT) .......................................... BO98A0219

(51) Int. Cl.⁷ ............................... G01B 5/00; G01B 5/20
(52) U.S. Cl. ............................... 33/556; 33/503; 33/559
(58) Field of Search .......................... 33/556, 557, 558, 33/559, 560, 561, 503, 504

(56) References Cited

U.S. PATENT DOCUMENTS

| | | | |
|---|---|---|---|
| 4,510,693 A | 4/1985 | Cusack | 33/174 L |
| 4,532,713 A | * 8/1985 | Feichtinger | 33/559 |
| 4,780,961 A | 11/1988 | Shelton et al. | 33/503 |
| 4,859,817 A | 8/1989 | Cassani | 33/559 |
| 5,253,428 A | 10/1993 | McMurtry | 33/559 |
| 5,319,858 A | 6/1994 | Coy | 33/561 |
| 5,323,540 A | 6/1994 | McMurtry et al. | 33/556 |
| 5,634,280 A | * 6/1997 | Heilier et al. | 33/559 |
| 5,659,969 A | 8/1997 | Butler et al. | 33/561 |
| 5,756,886 A | 5/1998 | Nishimura et al. | 33/558 |
| 5,778,551 A | 7/1998 | Herklotz et al. | 33/554 |
| 5,848,477 A | 12/1998 | Wiedmann et al. | 33/556 |

* cited by examiner

*Primary Examiner*—Diego Guiterrez
*Assistant Examiner*—Madeline Gonzalez
(74) *Attorney, Agent, or Firm*—Dickstein Shapiro Morin Oshinsky LLP

(57) ABSTRACT

Head for checking linear dimensions of parts in machine tools or measuring machines, with a casing, a movable arm-set including an arm carrying a feeler for contacting the part to be checked, a biasing device arranged between the casing and the movable arm-set, a detecting device for providing a signal depending on the position of the movable arm-set, and two constraining systems—between the casing and the movable arm-set—both totally with force closure under the action of the biasing device, that eliminate, in a univocal way, the six degrees of freedom of the movable arm-set, one of the two constraining systems featuring a structure with rotational symmetry.

30 Claims, 9 Drawing Sheets

HEAD FOR CHECKING LINEAR DIMENSIONS OF PARTS

BACKGROUND OF THE INVENTION

1. Field of the Invention

The present invention relates to a head for checking linear dimensions of parts in machine tools or measuring machines, with a support structure, a movable arm-set including an. arm carrying a feeler for contacting the part to be checked, a bias device arranged between the support structure and the movable arm-set, a first constraining system having a structure with rotational symmetry about a first geometrical axis and a second constraining system of a type different from that of the first constraining system, the first and the second constraining system being arranged between the support structure and the movable arm-set, for eliminating, under the action of the bias device, the six degrees of freedom of the movable arm-set, the degrees of freedom eliminated by the first constraining system including the translation of the movable arm-set along said first geometrical axis, and a detecting device for providing a signal depending on the position of the movable arm-set.

2. Description of the Related Art

Contact detecting heads, or touch trigger probes, and measuring heads are used in co-ordinate measuring machines and machine tools, particularly machining centres and turning machines, for checking machined or being machined parts, tools, machine tables, etc. These heads generally include a movable arm-set with an arm carrying one or more feelers, a biasing device for urging the arm-set against a support structure, and a detecting device with one or more switches, or other devices for providing a triggering signal, or with position transducers.

In connection with contact detecting heads, the displacement of the feeler due to the contact with the part causes triggering of the detecting device, that in turn controls the reading of transducers associated with the machine slides, that provide measurement values with respect to a reference position or origin.

Basic requirements for these heads are the repeatability i.e., the correspondence among determined positions of the feeler and the triggering of the detecting device or, for the measuring heads, the values of the signals of the transducers of the head, reliability, sturdiness, small overall dimensions and a limited cost.

An indicative value of the acceptable repeatability error for these heads is of 1 $\mu$m, or less.

Some of the heads are anisotropic with respect to triggering of the detecting device as a consequence of transversal displacements of the feeler. On this regard, it is pointed out that normally the transversal displacements are not purely translational, but correspond, for example, to rotational displacements of the movable arm-set. However, in view of the small entity of the feeler displacements, it is customary to refer to feeler displacements along the directions of the transversal axes.

Substantially, the concept of anisotropy consists in that, as the direction of the transversal displacement changes, the triggering of the detecting device takes place in correspondence with different eccentricity values of the feeler with respect to the longitudinal geometric axis of the head.

An example of a head strongly anisotropic is illustrated in FIGS. 1 to 3 of U.S. Pat. No. 4,153,998.

Another anisotropic head is described in the Japanese patent application laid-open with number 63-263406.

Other known heads, as those described in U.S. Pat. No. 5,299,360, GB-A-2,205,650 and inventor's certificate SU-A-1516786, and some of those described in U.S. Pat. No. 5,146,691, in particular the head shown in FIGS. 1 to 3 of the latter patent, are, at least conceptually, of isotropic type.

Further differences among the conventional heads relate to the systems for constraining the movable arm-set to the support structure.

As well known, a rigid body free in space has six degrees of freedom that, with reference to a Cartesian co-ordinate system, consist in the possibility of performing translations along the axes X, Y and Z and rotations about the same axes.

As an example, the movable arm-set of the head described in U.S. Pat. No. 5,299,360 has, in the absence of forces acting on the feeler, two degrees of freedom (possibility of rotating about the X and Y axes). The movable arm-set of the head shown in FIGS. 1 to 3 of U.S. Pat. No. 4,153,998, that is coupled to the support structure through a constraining system constituted by the so-called Boys' joint (three cylindrical elements fixed to the arm-set and three pairs of balls fixed to the support structure), does not feature, still in absence of forces acting on the feeler, any degree of freedom.

The systems constraining the movable arm-set with respect to the support structure can feature force closure and/or deformations.

In the kinematic constraint systems (shape constraints with force closure), the degrees of freedom (one or more) are eliminated under the action of forces, for example elastic forces, that "close" conceptually rigid elements of the system, maintaining them into contact. When the feeler is biased by forces having values higher than the above mentioned elastic forces, it displaces and eliminates the concerned constraint, without causing (conceptually, namely with reference to ideal rigid bodies) deformations of the constraint system. An example of a head with constraint system with full force closure is the already mentioned head shown in FIGS. 1 to 3 of U.S. Pat. No. 4,153,998, that features a Boys' joint, i.e. a system typically featuring an anisotropic structure.

On the contrary, in connection with constraints featuring deformations, like the leaf spring of the head described in GB-A-2,205,650, the displacement of the feeler occurs due to the elastic deformation of one or more elements of the constraint system.

The constraint systems featuring deformations involve some problems, for example because the deformations must be limited, in order to avoid that they become permanent, and because these systems normally feature poor ruggedness. In particular, drawbacks of this type arise when the feeler must have the possibility of performing large movements, for example in contact detecting heads used in machine tools requiring very fast measurement cycles. In similar situations, the head must allow large values of the "extra-travel" of the feeler after the generation of the triggering signal.

Further drawbacks occurring in some conventional heads derive from the fact that the constraint systems used in these heads would give rise to situations of over-constraint, because the constraints would be in excess with respect to those needed to eliminate one or more degrees of freedom of the movable arm-set. For example, if a head features two independent constraints with respect to the axial translation of the movable arm-set, it is necessary to add a de-coupling device for eliminating the effect of one of the constraints on the feeler, in order to avoid instability problems and thus poor repeatability of the head. The elimination of the superabundant constraints involves complications in the head structure and other drawbacks (use of de-coupling elements based on deformations, arm-sets consisting of a plurality of mutually movable elements, need of a plurality of biasing devices). Similar situations occur in the heads described in the already mentioned patent U.S. Pat. No. 5,146,691.

SUMMARY OF THE INVENTION

An object of the present invention is to provide a contact detecting head, or a measuring head, permitting advantageous compromises, with respect to the prior art, in connection with the characteristics of repeatability, sturdiness, isotropy, reliability, simplicity of structure, possibility of use both in metrology department and in workshop environment, or some of these characteristics.

A favourable compromise of relatively general character is obtained by a head of the type initially mentioned, that corresponds to that described in the patent application GB-A2,205,650, in which the first constraining system and the second constraining system are totally with force closure.

More generally, the invention relates to characteristics regarding the structure and the functions of the constraining systems, the bias device and the detecting device, considered singly or in combination with other characteristics.

BRIEF DESCRIPTION OF THE DRAWINGS

The invention will be described in detail with reference to the annexed drawings, given for exemplary and non limiting purpose, wherein.

DESCRIPTION OF PREFERRED EMBODIMENTS

Figure 1:
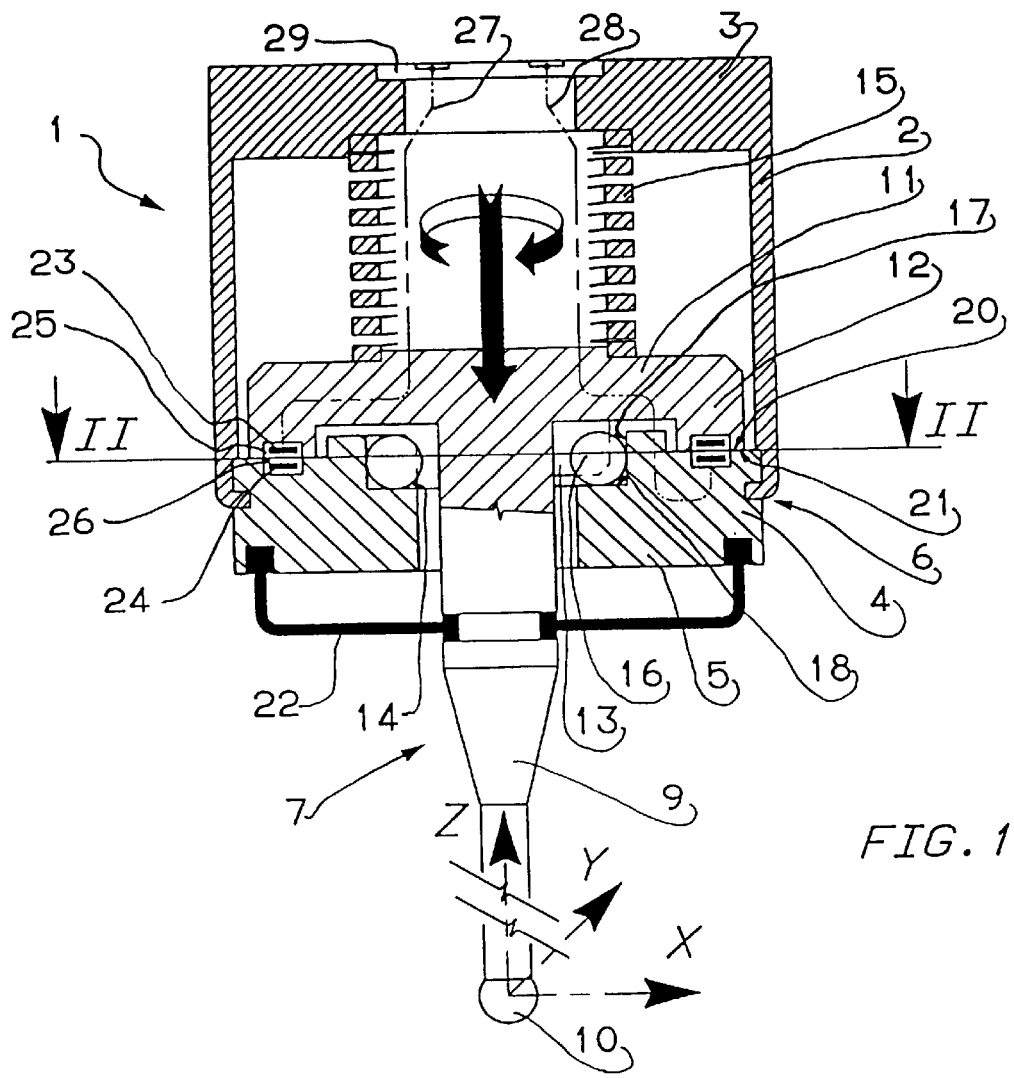
FIG. 1 is a longitudinal section, along path I—I in FIG. 2, of a contact detecting head, according to the preferred embodiment of the invention.
Figure 2:
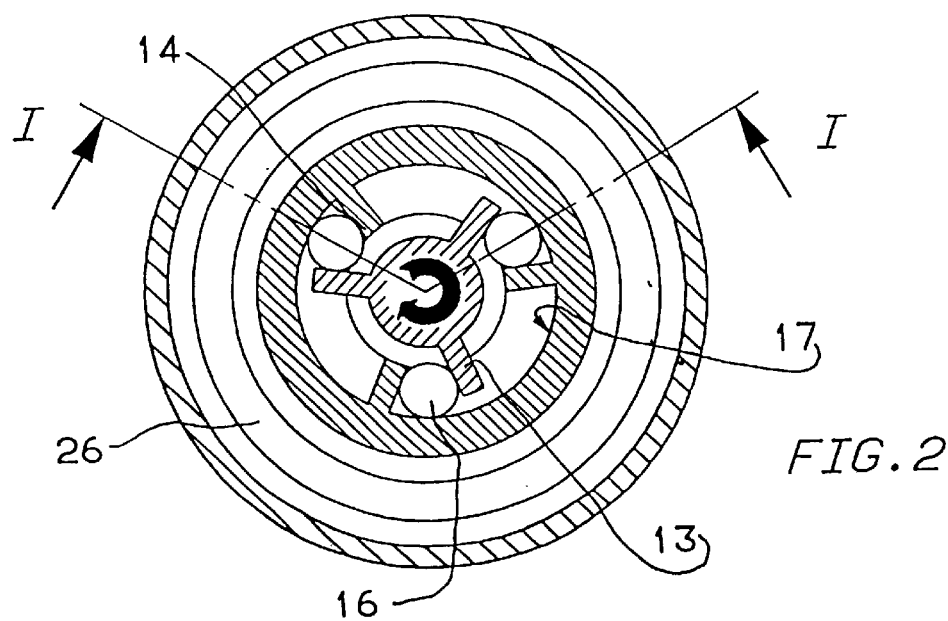
FIG. 2 is a partial cross-section of the head shown in FIG. 1, along path II—II of FIG. 1.

The head of FIGS. 1 and 2 comprises a support structure, or casing 1 including a first member 2, substantially cylindrical and having an upper base 3, and a second member 4, substantially annular, with a lower base 5. The first and the second member 2, 4 are secured to each other, in correspondence with the ends opposite to the bases 3 and 5, by a fixed or detachable coupling 6 represented in a very schematic way.

The movable arm-set 7 of the head comprises an arm 9 carrying at an end external to casing 1 a feeler 10 and at the other end a member having the shape of a circular disc 11, with an annular portion 12 protruding towards feeler 10.

Three plates or vanes 13 with plane walls are fixed to the arm-set 7, between the lower surface of disc 11 and the upper portion of arm 9. The walls of plates 13 lie in radial directions and along the longitudinal geometric axis Z of the head and are angularly spaced apart, with respect to the Z axis, at 120° from one another.

Three other plates or vanes 14, with flat radial walls, parallel to the Z axis, are fixed to member 4, angularly spaced apart at 120° from one another.

A double-coiled spring 15 is arranged between the lower surface of base 3 and the upper surface of disc 11, and is pre-loaded so as to apply to movable arm-set 7 an axial and torsional pre-load, as shown by the arrows in FIGS. 1 and 2, indicating that the torsional pre-load applies a rotation moment, in clockwise direction, to movable arm-set 7.

Three intermediate rolling elements, constituted by free balls 16, are arranged between adjacent surfaces of respective plates 13, 14. Due to the torsional pre-load applied by spring 15, the three balls 16 remain trapped between the pairs of plates 13, 14 and a cylindrical internal wall 17 of member 4. A transversal flat surface 18 of member 4 provides an axial limit stop for balls 16. Another axial limit stop for balls 16 is provided by the lower surface of disc 11.

An annular flat zone 20, i.e. with the shape of an annulus, at the lower surface of portion 12, is biased by spring 15 into contact with a corresponding annular flat zone 21 at the upper portion of member 4, so as to provide a first constraining system, with force closure, of the movable arm-set 7 with respect to casing 1. This constraining system is closed due to the axial pre-load applied by spring 15 and eliminates three degrees of freedom, relating to the translation along the longitudinal axis Z and rotations about the transversal axes X and Y of a Cartesian co-ordinate system.

A second constraining system, it too with force closure, includes plates 13, 14, balls 16, and wall 17. The second constraining system is closed due to the torsional pre-load applied by spring 15 and eliminates the other three degrees of freedom of movable arm-set 7, relating to translations along the X and Y axes and the rotation about the Z axis.

If an axial force, namely along the Z axis, having a value higher than that of the axial pre-load provided by spring 15, is applied to feeler 10 due to contact with a part to be checked, movable arm-set 7 undergoes a translational displacement along Z and annular zone 20 detaches from annular flat zone 21.

The structure of the head is made in such a way that the triangle having its three vertexes coinciding with the points of contact of each ball 16 with plates 13 and 14 and wall 17 is an isosceles triangle, with its base defined by the points of contact with plate 14 (stationary) and wall 17 (it too stationary). Therefore, during the translational displacement, balls 16 roll on the respective plates 13, 14 and wall 17. Since the motion of balls 16 is of pure rolling type, it involves frictional forces of negligible value.

If on the contrary a sufficient radial force, namely lying in a meridian plane of the X, Y, Z system, is applied to feeler 10 due to contact with a part to be checked, movable arm-set 7 undergoes a tilting displacement on a point of contact between annular zone 20 and annular flat zone 21 and, apart from this point, annular flat zone 21 detaches from annular zone 20. During this tilting motion balls 16 roll on the respective plates 13, 14 and the wall 17.

A sealing and protection gasket 22 is arranged between movable arm-set 9 and base 4.

The disengagement of the first constraining system, i.e. the total or partial detachment of annular zone 21 from annular zone 20, is detected by a detecting device connected to an alternating current supply and including a capacitor with two annular plates 23, 24, arranged in toroidal recesses 25, 26 obtained in annular portion 12 and in member 4. Recesses 25 and 26 are filled by a dielectric material and are crossed by conductors 27, 28 connected, respectively, to plates 23, 24 and to a printed circuit 29 fixed to upper base 3.

Any displacement of movable arm-set 7 with respect to casing 1 causes a variation of the capacitance of the capacitor including plates 23, 24, that is detected by an external circuit connected with printed circuit 29.

It is evident that a circuit with inductive coupling, connected to a detecting circuit properly modified, can be substituted for the capacitor including plates 23, 24.

Figure 3:
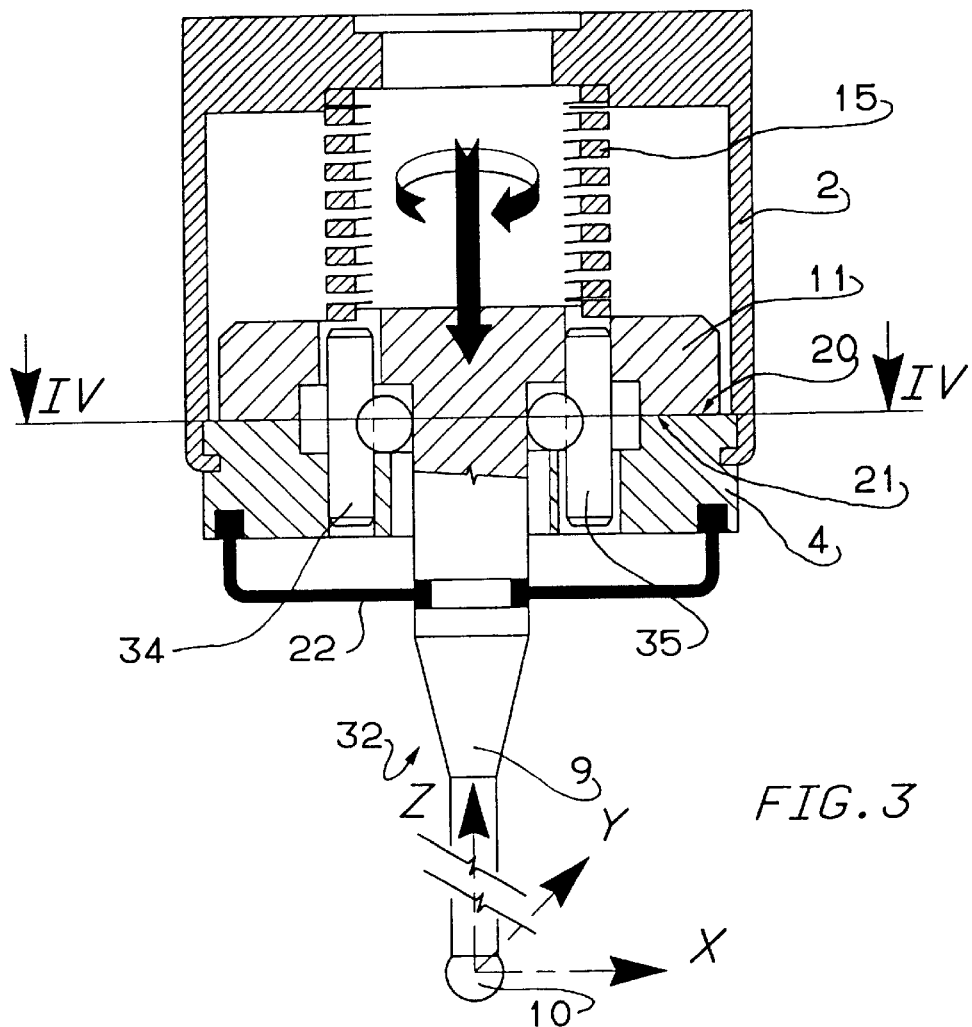
FIG. 3 is a longitudinal section, along path III—III of FIG. 4, of a contact detecting head according to a variant with respect to FIGS. 1 and 2, shown without the detecting device.
Figure 4:
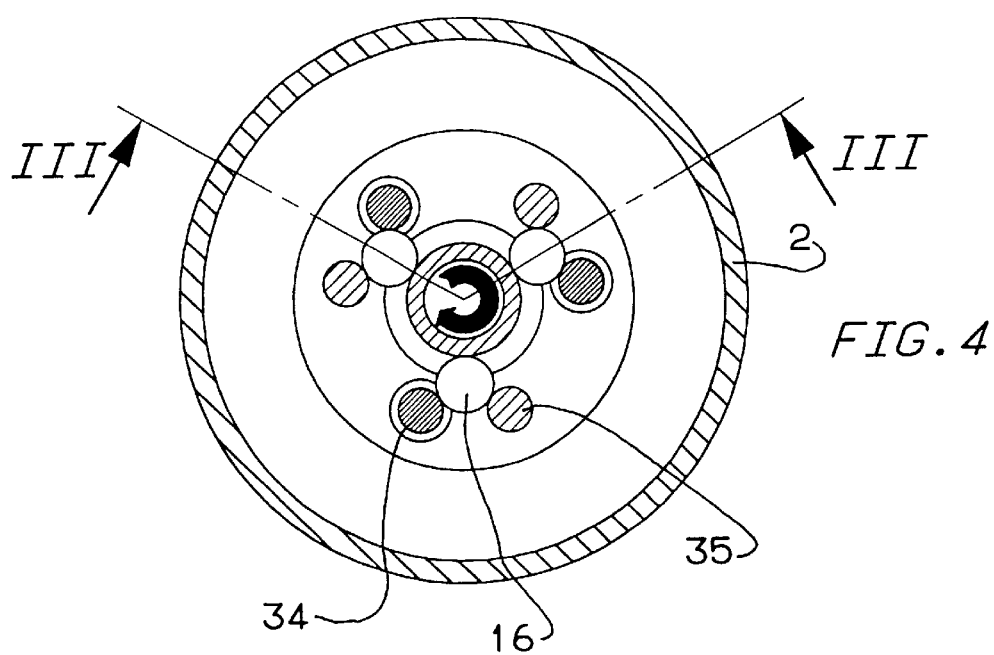
FIG. 4 is a partial cross-section of the head of FIG. 3, along path IV—IV of FIG. 3.

In FIGS. 3 and 4, that refer to a variant with respect to the head of FIGS. 1 and 2, elements equal or equivalent to those shown in FIGS. 1 and 2 are marked with the same reference numbers.

As per FIGS. 1 and 2, disc 11 and the upper portion of member 4 comprise two flat annular zones 20 and 21 that define a first constraining system adapted to eliminate three degrees of freedom of the movable arm-set 32 (translation along the Z axis and rotations about the X and Y axes).

A second constraining system is defined by a first tern of cylindrical pins 34 and a second tern of cylindrical pins 35. Pins 34 are fixed to member 4, are arranged substantially along the direction of longitudinal axis Z and are angularly spaced apart at 120° from one another. Pins 35 are fixed to disc 11, are arranged along the direction of longitudinal axis Z and are also angularly spaced apart at 120° from one another.

Three balls 16 are arranged between respective pairs of pins 34 and 35.

Due to the pre-load applied by spring 15 each ball 16 remains trapped between a pairs of pins 34 and 35 and the upper portion of arm 9, into contact with a point of a stationary element (a pin 34) and two points of movable elements (a pin 35 and arm 9).

The structure of the head is made in such a way that the triangle having its three vertexes coinciding with the points of contact of each ball 16 with pins 34 and 35 and movable arm 9 is an isosceles triangle, with its base defined by the points of contact with pin 35 (movable) and arm 9 (it too movable).

When a force with a sufficient value is applied to feeler 10, movable arm-set 32 undergoes displacements similar to those described with reference to movable arm-set 7 of the head shown in FIGS. 1 and 2.

Figure 5:
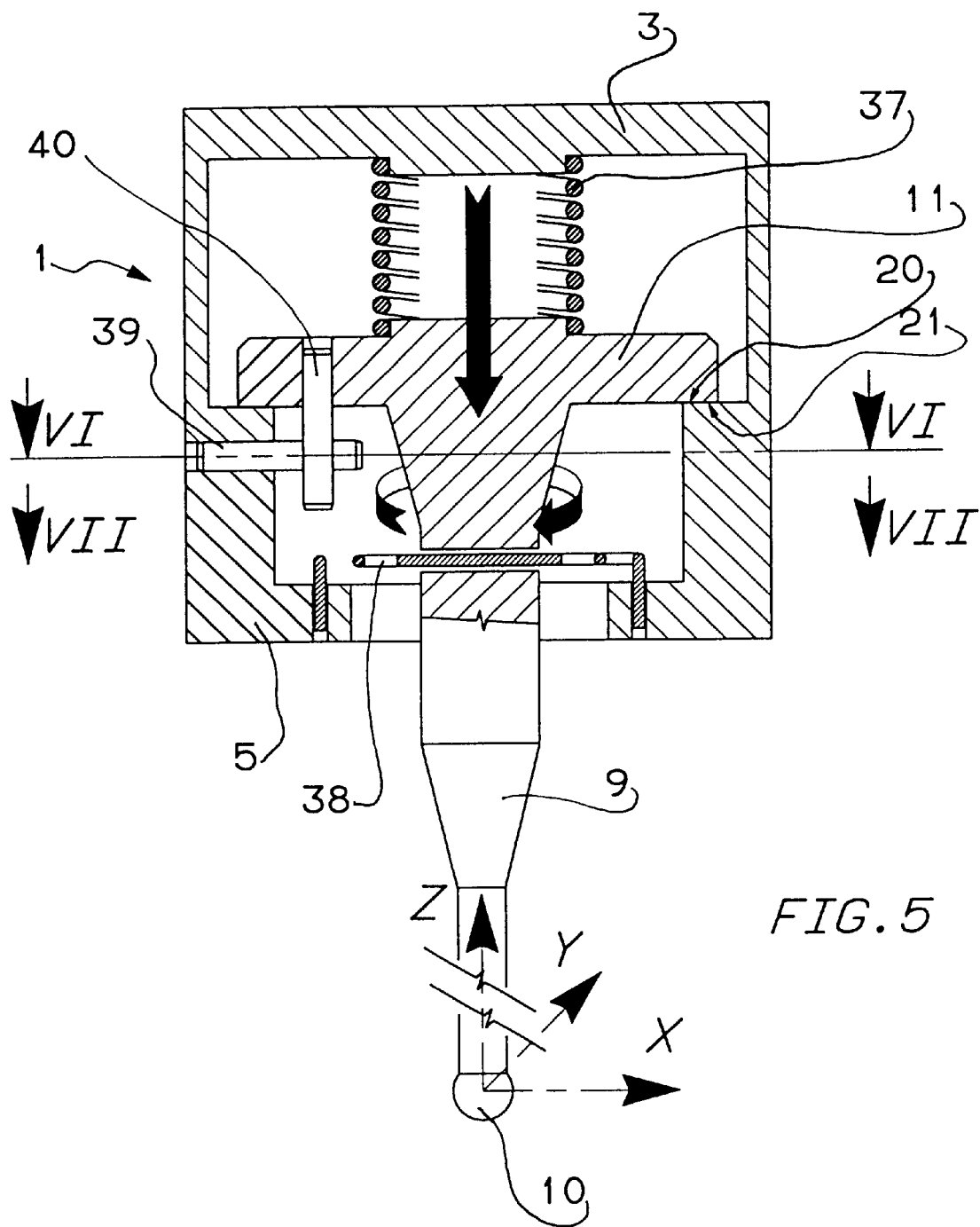
FIG. 5 is a longitudinal section, along path V—V of FIG. 7, of a contact detecting head according to another variant with respect to FIGS. 1 and 2, shown without the detecting device.
Figure 6:
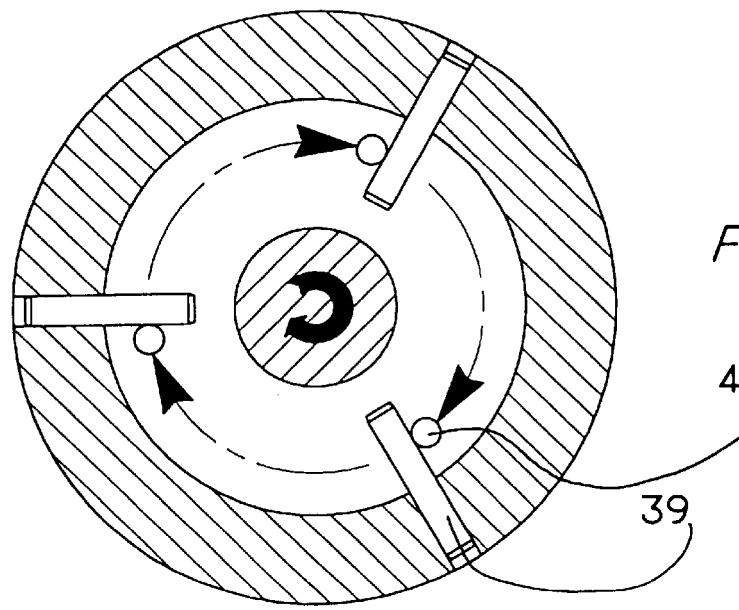
FIG. 6 is a simplified cross-section, along path VI—VI in FIG. 5, showing some details of the head of FIG. 5.
Figure 7:
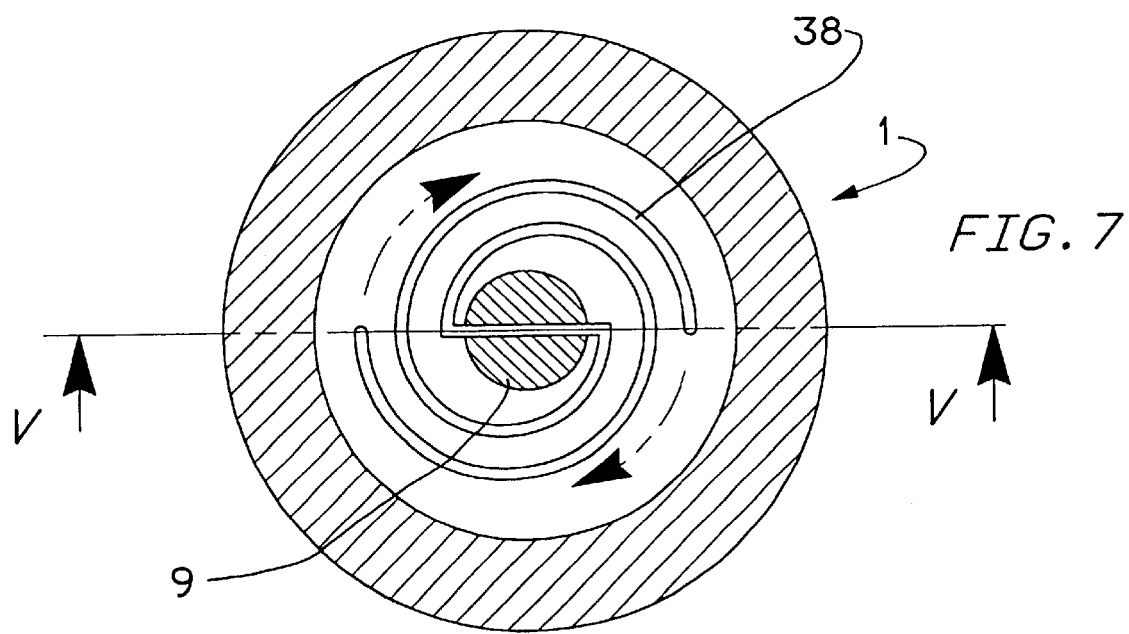
FIG. 7 is a cross-sectional view, along the plane passing through path VII—VII in FIG. 5, showing a spring of the head of FIGS. 5 and 6.

The head according to FIGS. 5 to 7, in which elements equal or equivalent to elements of the heads described before are marked with the same reference numbers, comprises two springs, rather than a single spring adapted to apply a pre-load both axial and torsional. A compression spring 37 is arranged between the lower surface of base 3 and the upper surface of disc 11, while a torsion spring 38, substantially flat, is arranged between arm 9 and lower base 5. Spring 38 has a central portion locked within a hole of arm 9 and two spiral coils with their ends fixed within axial holes obtained in base 5.

Three radial pins 39, fixed to casing 1, at 120° from one another, and three pins 40, substantially longitudinal, fixed to disc 11, they too at 120° from one another, provide constraints with respect to translations along axes X and Y and rotation about the Z axis. Due to the action of springs 37 and 38 each pin 40 is biased into contact with a corresponding pin 39.

When a force having a sufficient value is applied to feeler 10, the movable arm-set of the head of FIGS. 5 to 7 undergoes displacements similar to those of the arm-sets of the heads shown in the preceding figures. However, the mutual displacements among the pairs of pins 39 and 40 involve sliding frictions. In order to reduce the frictions, it is possible to use three ball bearings, not shown, having the inner rings keyed to the stationary pins 39, respectively, and the outer rings in contact with the movable pins 40.

Figure 8:
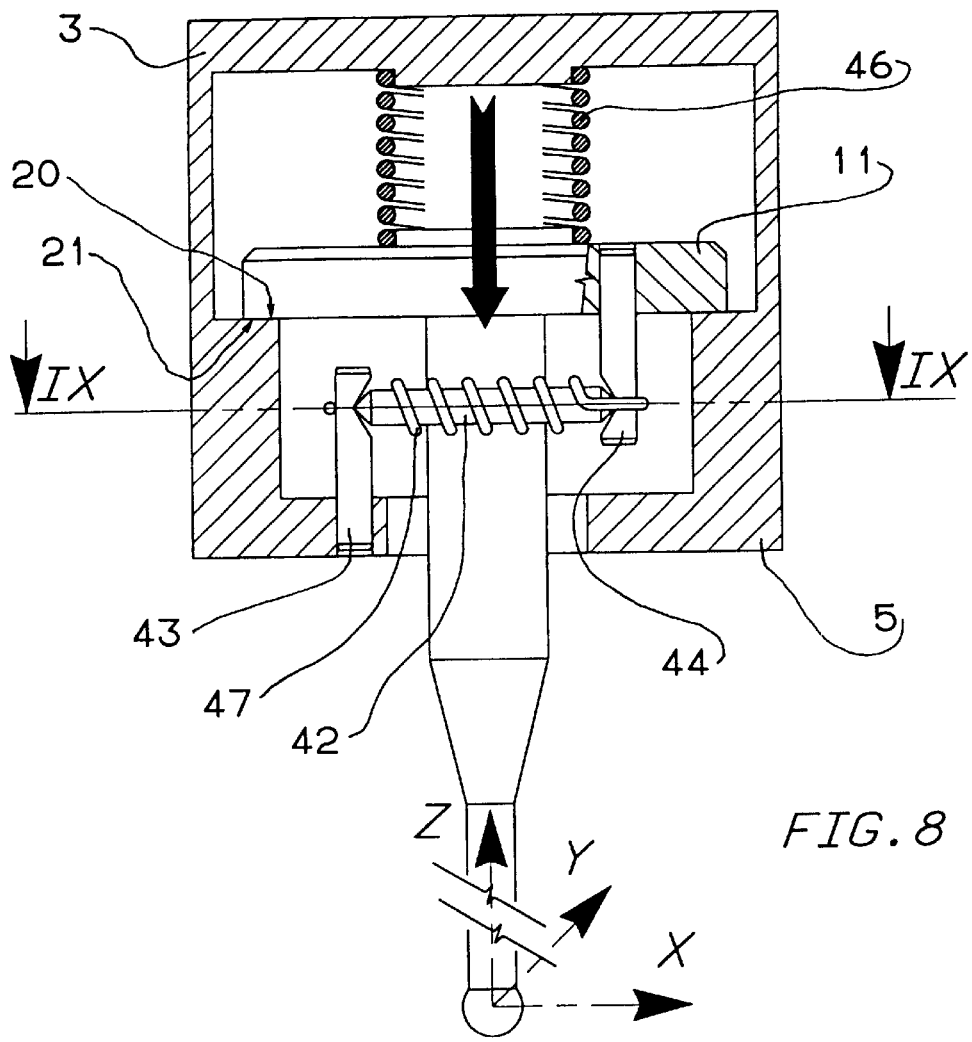
FIG. 8 is a longitudinal view, partially in section, of a contact detecting head according to another variant with respect to FIGS. 1 and 2, shown without the detecting device.
Figure 9:
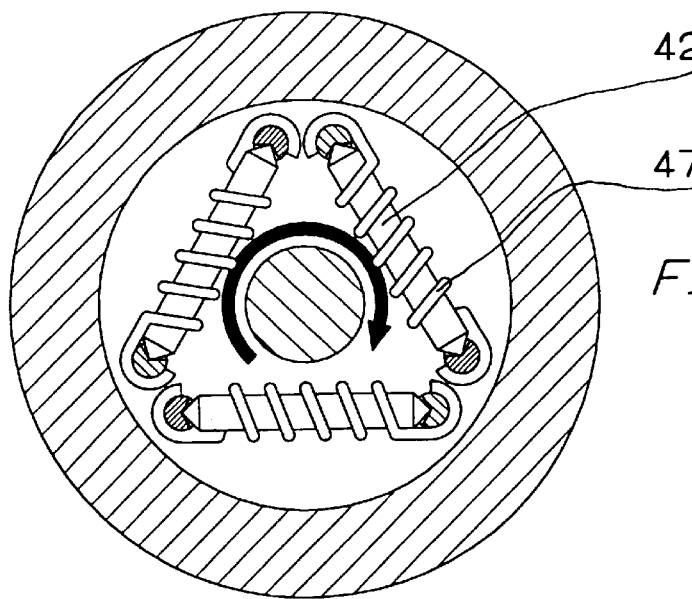
FIG. 9 is a cross-sectional view along the plane passing through path IX—IX in FIG. 8, showing some details of the head of FIG. 8.

The head shown in FIGS. 8 and 9, in order to provide constraints with respect to translations along the X and Y axes and rotation about the Z axis, comprises three struts 42 having conical ends housed in corresponding seats obtained in longitudinal pins 43 fixed to lower base 5 and in pins 44, substantially longitudinal, fixed to disc 11.

The ends of struts 42 are maintained into contact with the corresponding seats due to the combined action of a compression spring 46, arranged between the lower surface of base 5 and the upper surface of disc 11, and of three return springs 47 having their ends fixed to respective pins 43 and 44. It is evident that the arrangement of springs 47 gives rise to a torsional pre-load applied to the movable arm-set of the head, as indicated by the arrow in FIG. 9.

Figure 10:
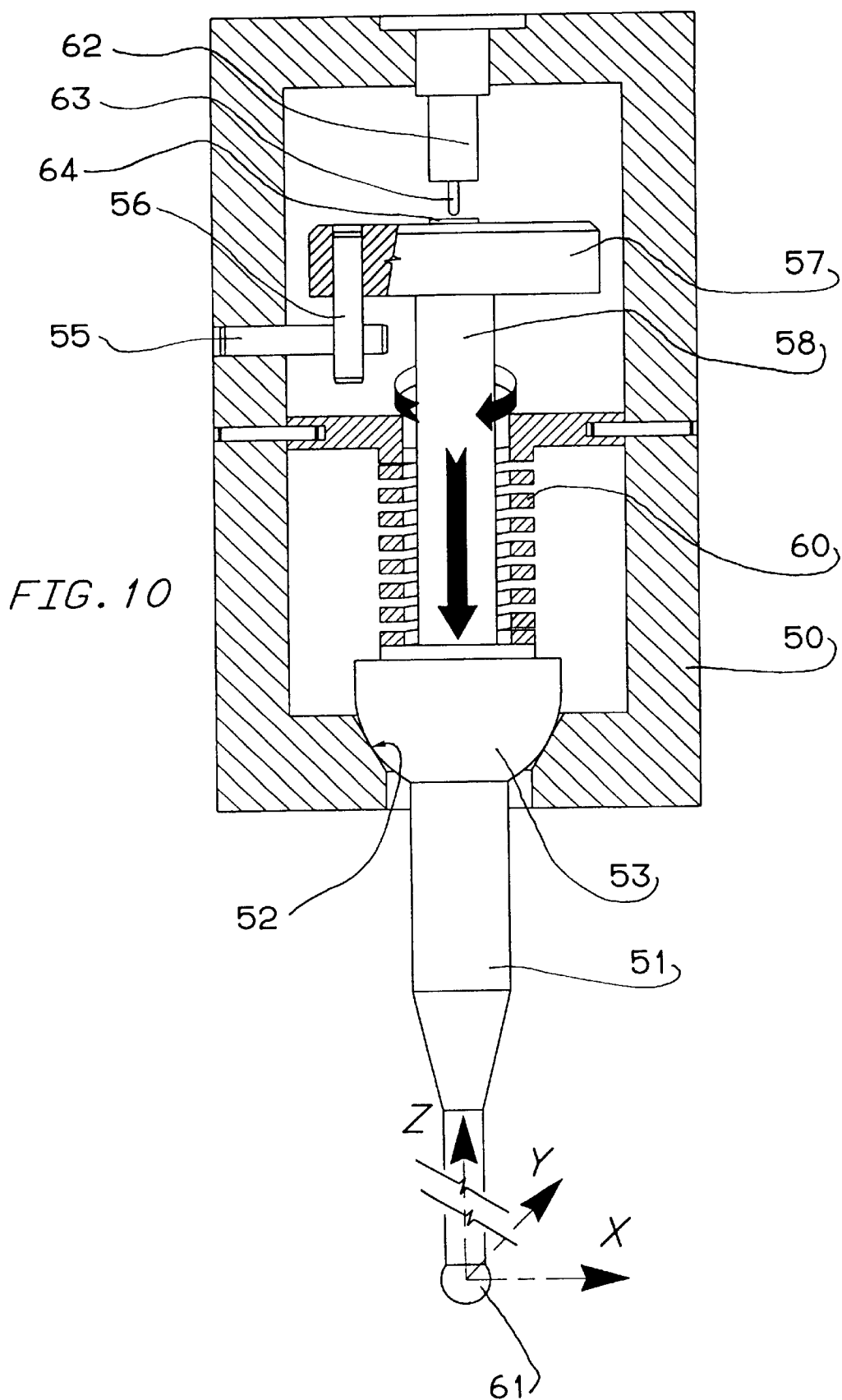
FIG. 10 is a longitudinal section showing a portion of a head according to another embodiment of the invention.

FIG. 10 partially shows another embodiment of the invention, that mainly differs from those of FIGS. 1 to 9 in that the first constraining system, including plane annular surfaces, substantially with the shape of annuluses, is replaced by another constraining system, also having a structure with symmetry of rotation, but with surfaces inclined to the Z axis. In particular, the lower base of casing 50 of the probe defines, in correspondence with an opening for the passage of movable arm 51, a surface with the shape of a truncated cone 52 that co-operates with an element 53 having the shape of a hemisphere or of a spherical sector, fixed to movable arm 51 .

This type of coupling is adapted, per se, to eliminate, due to the action of a suitable bias device, three degrees of freedom of the movable arm-set, consisting of translations along the X, Y and Z axes.

A second constraining system is constituted by a first tern of cylindrical pins 55 arranged horizontally and radially and fixed to casing 50 and by a second tern of cylindrical pins 56, fixed to a disc 57 coupled to an extension 58 of movable arm 51, and arranged substantially along the Z axis and, as for the first tern, at 120° from one another.

A double-coiled spring 60 with the ends fixed to casing 50 and element 53 provides a pre-load both axial and torsional, for maintaining into contact the corresponding pairs of stationary and movable pins 55 and 56.

Per se, the second constraining system is adapted to prevent the rotation of the movable arm-set about the Z axis and translations along the X and Y axes.

The second constraining system is arranged at a substantial longitudinal distance from the first constraining system: in particular, the distance from the point of contact between two pins 55, 56 to the plane containing the theoretical circumference of contact between the surface with the shape of a truncated cone 52 and element 53 is some times larger than the radius of the circumference of contact, for example 10 times larger.

Therefore, in view of well-known theorems from theoretic mechanics, notwithstanding both the first constraining system and the second constraining system prevent, singly, translations along the X and Y axes, this does not originate problems of superabundance of constraints, namely of overconstraint, because the combined effect of the two pairs of constraints relating to translations along X and Y is to provide single constraints with respect to translations along X and Y and additionally two constraints with respect to rotations about the same axes X and Y.

As for the head of the FIGS. 5 to 7, three ball bearings, not shown, can be arranged in the head of FIG. 10, too, in order to prevent sliding friction among pins 55 and 56.

As a consequence of the application to feeler 61 of a force having sufficient value and acting along the radial direction, element 53 partially disengages from the surface having the shape of a truncated cone 52, sliding on it, conceptually with a single point of contact.

A microswitch 62 with its casing fixed to the upper base of the probe casing 50 is provided for detecting the displacements of feeler 61. When feeler 61 is not under the action of any force, the end of the movable stem 63 of microswitch 62 is arranged at a small distance from an abutment plate 64 fixed to disc 57. Of course, this clearance gives rise to a certain pre-stroke before the activation of microswitch 62.

Figure 11:
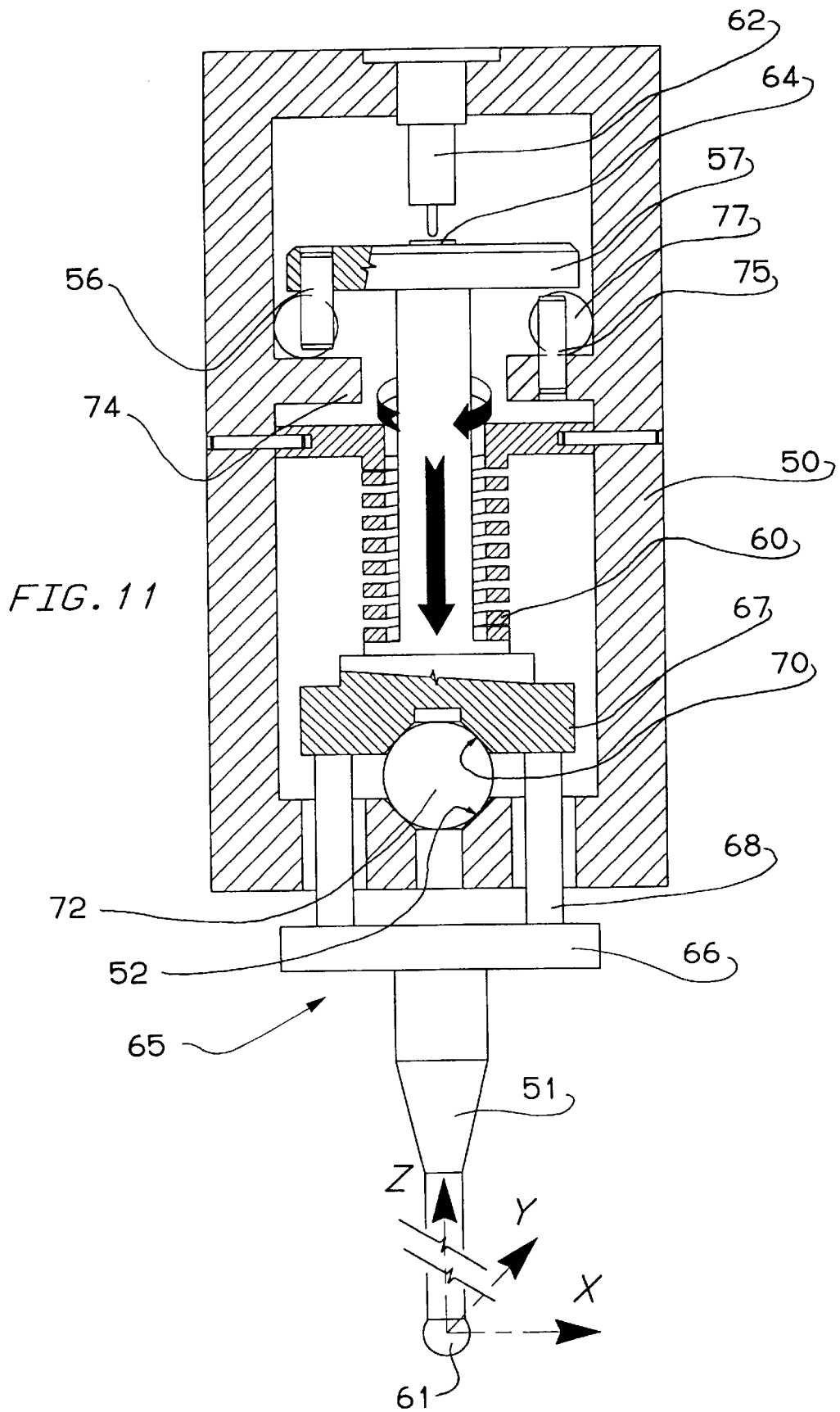
FIG. 11 is a longitudinal section showing a head according to a variant with respect to the head of FIG. 10.

The head shown in FIG. 11 is conceptually similar to that of FIG. 10, but is not subjected to sliding friction.

For this purpose, movable arm-set 65 comprises a plate 66 carrying arm 51 and a block 67 coupled to plate 66 by four studs 68. An end of the torsion and compression spring 60 is fixed to the upper portion of block 67, while the lower portion of block 67 defines a surface having the shape of a truncated cone 70, facing surface 52. A ball 72 is arranged between the surfaces having the shapes of truncated cones 52 and 70 and, as a consequence of lateral displacements of feeler 61, can move with respect to surfaces 52 and 70, with pure rolling motion.

Casing 50 of the head includes an internal annular flange 74 that caries three longitudinal 30 pins 75, arranged at 120° from one another. Three balls 77 are arranged between pins 75 and pins 56 and permit movable pins 56 to displace with respect to stationary pins 75 without any sliding friction.

It can be noticed that, in connection with the heads shown in FIGS. 3 to 9, for simplification sake, no detecting device for detecting the displacement of the feeler, and/or the entity of the displacement, has been described.

However, for all of the heads shown in FIGS. 1 to 11, it is possible to use the capacitive device described with reference to FIGS. 1 and 2, or the microswitch device used in the heads of FIGS. 10 and 11, or devices of other types.

Moreover, it is possible to use detecting devices and measurement transducers, such as devices with one or more linear variable differential transducers, or with transducers of other types.

Figure 12:
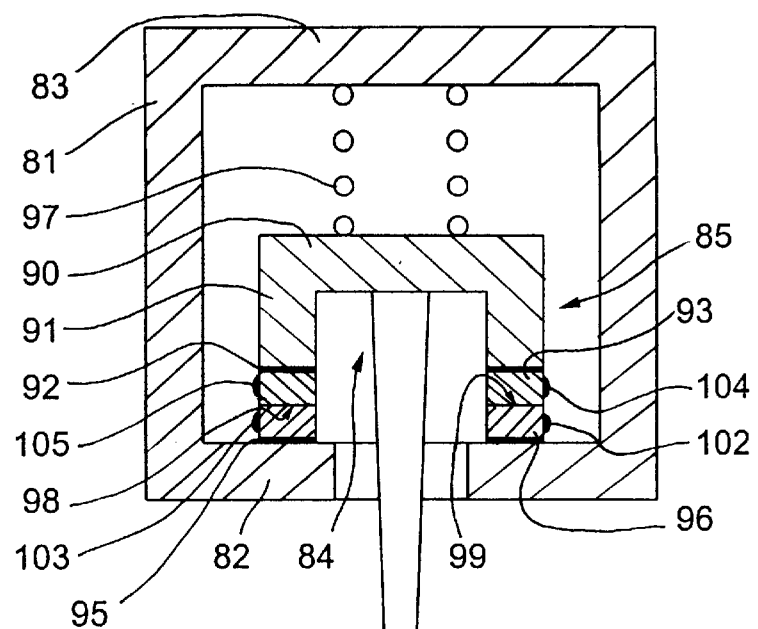
FIG. 12 partially and schematically shows a head with detecting device of resistive type.
Figure 13:
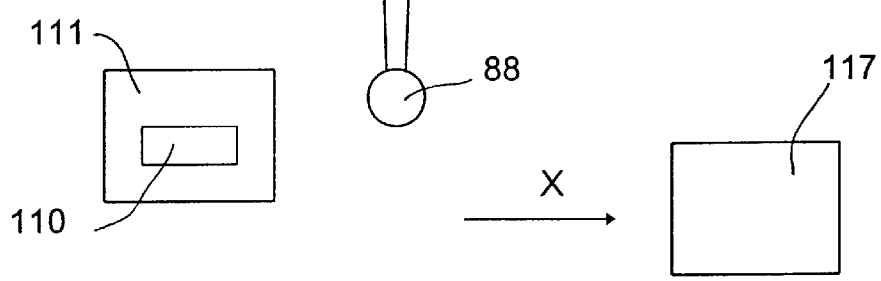
FIG. 13 shows a detecting circuit of the head of FIG. 12.
Figure 13:
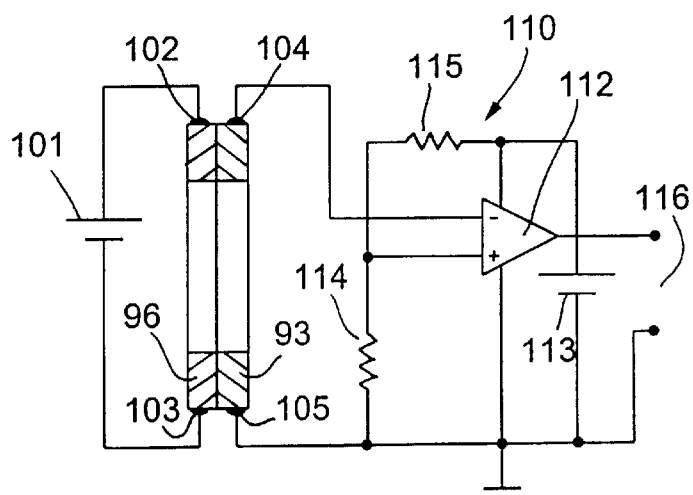

FIGS. 12 and 13 refer to a head or probe with a resistive detecting device, which can be used for all of the embodiments shown in FIGS. 1 to 11. For the sake of simplification, the constraining systems of the probe of FIG. 12 are shown only partially.

The probe partially shown in FIG. 12 comprises a support and protection structure with a casing 81, having a lower base 82 and an upper base 83. Casing 81 has a substantially cylindrical shape and defines a longitudinal geometric axis (Z axis in a Cartesian co-ordinate system).

A movable arm-set 84 is partially housed within casing 81 and includes a support element 85, an arm 86 coupled to support element 85 and partially protruding from casing 81 through a hole of the lower base 82, and a feeler 88 fixed to a free end of arm 86. Support element 85 comprises an upper base 90, a cylindrical portion 91 ending with an annular end, a ring 92, made of electrically insulating material, fixed to the annular end, and another ring 93 made of electrically resistive material, fixed to ring 92.

A third ring 95, made of insulating material, is internally fixed to the lower base 82 of casing 81 and a fourth ring 96, made of electrically resistive material, is fixed on the third ring 95.

A biasing device comprises a compression spring 97 arranged between the upper base 83 of casing 81 and support element 85, for urging the lower annular surface 98 of ring 93 into contact with the upper annular surface 99 of ring 96.

When arm-set 84 is in rest condition, i.e. in the absence of forces acting on feeler 88, the constraining device including the lower annular surface 98 of ring 93 and the upper annular surface 99 of ring 96 is closed by the force provided by spring 97 and prevents displacements of movable arm-set 84 in connection with the translation along the longitudinal axis (Z axis) of the probe and displacements of rotation about the transversal axes X and Y.

The constraining system of the movable arm-set 84 comprises further constraining means for preventing translations of the movable arm-set along the transversal axes X and Y and displacements of rotation about the longitudinal axis Z. For the sake of simplification, the further constraining means are not shown in the drawings. They can be made in different ways, for example (also in connection with the bias device) in accordance with FIGS. 1 to 11.

Also in the head of FIG. 12 (and similarly in the heads of FIGS. 5, 8, 10 and 11) one or more gaskets, or similar sealing and protection elements, not shown in the drawings, are fixed between movable arm 86 and the lower base 82 of casing 81.

With reference to FIG. 13, an electronic detecting device comprises a generator, or direct current source 101, which applies a difference of electric potential between two contacts 102, 103, connected to diametrically opposite points of ring 96, and a detecting circuit 110, which receives the voltage existing between two contacts 104, 105 connected with diametrically opposite points of ring 93 located (in the condition of FIG. 12) on the same meridian plane containing the points connected with contacts 102, 103.

Detecting circuit 110, that can be arranged in a control, display and supply unit 111, comprises a comparator 112, fed by a voltage source 113 and having the inverting input connected with contact 104 and the non-inverting input connected with contact 105, through a resistor 114 of a voltage divider including another resistor 115.

Annular surfaces 98, 99 are accurately lapped so as to approach the theoretical condition of mutual contact on their whole facing areas when feeler 88 is not subjected to forces.

In this condition, electric current flows though ring 93. A difference of potential (lower than that present across contacts 102 and 103, but in any case sufficient for the purposes described below) is present across contacts 104 and 105.

In substance, it can be said that, from an electrical point of view, rings 93 and 96 are "substantially" in parallel. On this regard, it can be commented that, since the contact is distributed, the wording "in parallel" would not be totally proper.

Due to the mutual approach between the probe and part 117 along the Z axis and the contact of feeler 88 against part 117, movable arm-set 84 can translate, against the bias provided by spring 97, and ring 93 totally detaches from ring 96, so that the difference of potential across contacts 104 and 105 becomes equal to zero.

In the case of mutual approach and contact along a transversal direction, for example along the X direction, as shown in FIG. 12, movable arm-set 84 tilts on a point of surface 99 and in this case, too, the current flow through ring 93 ceases and the difference of potential across contacts 104 and 105 become equal to zero.

Comparator 112 compares a threshold value defined by voltage divider 114, 115, fed by voltage source 113, with the difference of potential across contacts 104 and 105. When arm 86 is not deflected the signal at the output 116 of comparator 112 is at low level, while when arm 86 is deflected the signal at output 116 is at high level.

Figure 14:
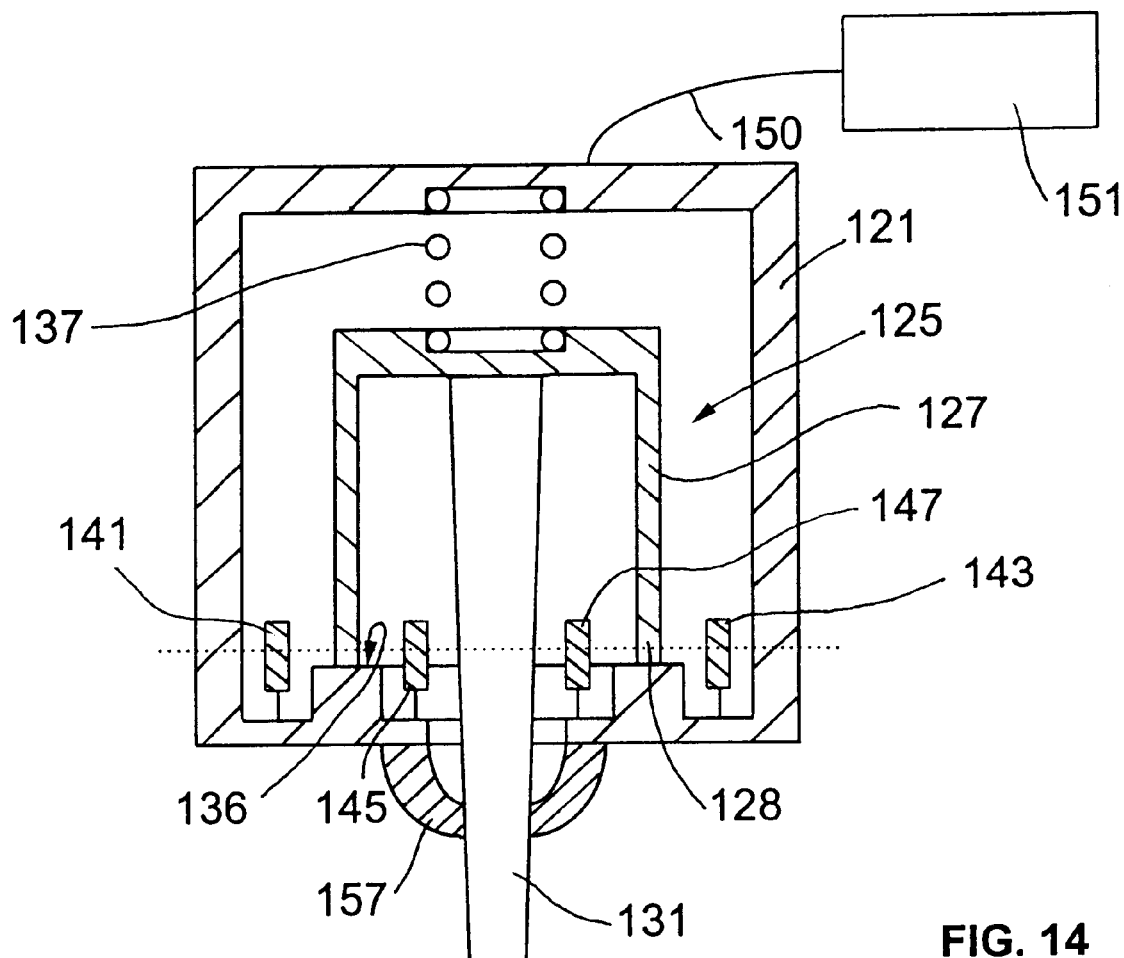
FIG. 14 shows in a schematic and partial way a head with an opto-electronic detecting device.

FIG. 14 refers to a probe with an opto-electronic detecting device, that can be used for all of the embodiments shown in FIGS. 1 to 11.

The probe schematically shown in FIG. 14 comprises support and protection means with a casing 121, having substantially a cylindrical shape and defining a longitudinal geometric axis Z, comprising a lower base, defining an internal support surface 136 substantially flat and annular, and an upper base. A movable arm-set 125 is partially arranged within casing 121 and includes a support element 127 defining a portion or annular edge 128, substantially with rotational symmetry, an arm 131 coupled to support element 127 and partially protruding with respect to casing 121 through a hole in the lower base, and a feeler 133 secured to a free end of arm 131.

A biasing device includes a compression spring 137 arranged between surfaces of the upper base of casing 121 and of support element 127 for urging annular edge 128 and support surface 136 into mutual contact when arm-set 125 is in rest condition, in absence of contact between feeler 133 and a part 135 to be checked.

Centering and anti-rotation devices (for example, similar to those of the heads of FIGS. 1 to 11, also with respect to the bias device) are arranged, for example between movable arm-set 125 and casing 121, in order to prevent mutual displacements of transversal translation and rotation about the longitudinal axis Z. These devices are not shown in FIG. 14, for the sake of simplification.

A detecting device, of opto-electronic type, comprises emitter devices and receiver devices. In particular, two light emitting diodes 141, 143, or "LEDs", are fixed to the lower base of casing 121, arranged in diametrically opposite positions, substantially in correspondence of the plane defined by annular surface 136. Two receiving photodiodes 145, 147 are also fixed to the lower base of casing 121, substantially on the same plane of LEDs 141, 143 and facing them. The mutual arrangement of the elements of each of the pairs LED/photodiode 141/145 and 143/147 is such that the light beam emitted by the LED is directed toward the corresponding photodiode along a determined path that consists of a section transversal with respect to the longitudinal axis Z of casing 121.

The two LEDs 141, 143 and the two photodiodes 145, 147 are electrically connected to a supply and processing unit 151, by means of cables schematised in FIG. 14 and marked with reference numeral 150.

A sealing gasket 157 has its ends fixed to the lower base of casing 121 and arm 131, respectively, and besides protecting the internal arm-set of the probe from foreign matter prevents the passage of light into the probe.

The two LEDs 141 and 143, connected in series, can be fed by direct current or pulse current.

The operation of the probe of FIG. 14, in the case of supply of LEDs 141 and 143 by direct current, is as follows.

In absence of contact between feeler 133 and the part 135 to be measured, arm-set 125 is in a rest condition in which annular edge 128 and support surface 136 are into mutual annular contact due to the bias provided by spring 137. In this condition, the light beams emitted by LEDs 141, 143 do not reach photodiodes 145, 147, because impinge on edge 128.

During a mutual movement between the probe and part 135 to be checked, along radial direction X, after the contact, at a time $t_1$, between feeler 133 and a surface of part 135, arm 131 and the whole movable arm-set 125 tilt with respect to casing 121 and edge 128 partially rises from annular surface 136, permitting the passage of the light beam emitted by one of the LEDs, for example LED 143. The light beam impinges upon the corresponding photodiode 147, which generates a signal $V_f$, that is amplified by an amplifier and compared, in a comparator, with a threshold $V_T$. When the value $V_T$ is exceeded, at a time $t_1+\tau$, there is generated an output signal that signals the occurrence of the contact between feeler 133 and part 135.

In the case of longitudinal movement between the probe and the part 135, and of contact between feeler 133 and a transversal surface of the part 135 along the Z direction, arm 131 and movable arm-set 125 rise and cause edge 128 to detach from annular surface 136. In this condition, the light beams emitted by LEDs 141, 143 reach the corresponding photodiodes 145, 147 and the processing of the signals $V_f$ provided by the latter takes place as previously described.

In the probe of FIG. 14 it is possible to introduce the other modifications and variants. In particular, it is possible to use emitters and receivers of types different from those previously described. For example, the photodiodes can be replaced by CCD devices ("Charge Coupled Devices") or phototransistors. Moreover, it is possible to use non-optical systems, for example other radiating systems, such as systems based on ultrasounds or microwaves, in place of the couplings LED-photodiode.

Of course, further changes may be introduced into the embodiments described and illustrated, without departing from the scope of the invention.

For example, in the probes shown in FIGS. 1 to 4, 10 and 11 rather than a torsion and compression spring 15, it is possible to use two springs similarly to what has been described for the embodiment shown in FIGS. 5 to 7, and vice versa.

In order to reduce a possible anisotropic behaviour of the heads of FIGS. 1 to 9, it is suitable that the width of the annular contact zone between annular surface 20 and annular surface 21 be sensibly lower than the inner radius of the same annular zone, so that, from a practical point of view, the contact zone can be considered equivalent to a circumference. On this regard, it is pointed out that the dimensions in the figures should not be considered significant. Similar comments apply for the head of FIGS. 12 to 14.

Thus, all of the embodiments shown in FIGS. 1 to 11 feature heads with isostatic coupling of the movable arm-set, conceptual isotropy with respect to transversal displacements of the feeler, for both a contact detecting probe and a measuring probe, and constraints totally with force closure.

What is claimed is:

1. A head for checking linear dimensions of parts in machine tools or measuring machines, said head comprising a support structure, a movable arm-set including an arm carrying a feeler for contacting the part to be checked, a bias device arranged between the support structure and the movable arm-set and adapted to apply to the movable arm-set a force along a geometrical axis and a moment of rotation about the same geometrical axis, a first constraining system having a structure with rotational symmetry about said geometrical axis and a second constraining system of a type different from that of the first constraining system, the first and the second constraining systems being arranged between the support structure and the movable arm-set, for eliminating, under the action of the bias device, the six degrees of freedom of the movable arm-set, the degrees of freedom eliminated by the first constraining system including the translation of the movable arm-set along said geometrical axis, and a detecting device for providing a signal depending on the position of the movable arm-set, wherein the first constraining system and the second constraining system are totally with force closure.

2. The head according to claim 1, wherein said first constraining system comprises a first element fixed to the support structure and a second element fixed to the movable arm-set, the first and second elements being adapted to enter into contact with each other in points arranged substantially in a circumference living in a plane perpendicular to said first geometrical axis.

3. The head according to claim 2, wherein said first constraining system comprises a coupling with at least a surface of rotation inclined with respect to said first geometrical axis (Z), for eliminating three degrees of freedom of the movable arm-set, these three degrees of freedom relating to translations along said first geometrical axis and geometrical axes (X, Y) transversal with respect to said first geometrical axis.

4. The head according to claim 3, wherein said coupling is substantially of the ball-cone type.

5. The head according to claim 3, wherein said second constraining system is adapted to eliminate a further degree of freedom of the movable arm-set, relating to the rotation about said first geometrical axis and, in combination with said first constraining system, two further degrees of freedom relating to rotations about said transversal geometrical axes.

6. The head according to claim 5, wherein said support structure includes a first portion and a second portion spaced apart along said first geometrical axis and said first constraining system is arranged at said first portion and said second constraining system is arranged at said second portion.

7. The head according to claim 1, wherein said first constraining system is adapted to eliminate three degrees of freedom of the movable arm-set and said second constraining system is adapted to eliminate the other three degrees of freedom of the movable arm-set.

8. The head according to claim 1, wherein said first constraining system includes an annular surface and a substantially flat surface, the two surfaces being biased into substantially annular mutual contact by the force provided by the bias device, for eliminating three degrees of freedom of the movable arm-set, these three degrees of freedom relating to the translation along said first geometrical axis and rotations about geometrical axes transversal with respect to said first geometrical axis.

9. The head according to claim 8, wherein said second constraining system is adapted to eliminate the three further degrees of freedom of the movable arm-set, these three further degrees of freedom relating to the rotation about said first geometrical axis and translations along said transversal geometrical axes.

10. The head according to claim 9, wherein said second constraining system comprises a first tern of elements fixed to the movable arm-set and a second tern of elements fixed to the support structure.

11. The head according to claim 10, wherein the elements of each of said terns are arranged about said first geometrical axis at angular distance of 120° from one another.

12. The head according to claim 10, wherein said second constraining system comprises at least three rolling devices arranged between a respective one of said elements fixed to the support structure and a respective one of said elements fixed to the movable arm-set.

13. The head according to claim 12, wherein each of said rolling devices includes a spherical element.

14. The head according to claim 13, wherein said support structure defines axial limit stop surfaces for the spherical elements of the three rolling devices.

15. The head according to claim 10, wherein each of said terns of elements includes three pins.

16. The head according to claim 10, wherein the elements of one of said terns comprise first pins arranged substantially parallel to said first geometrical axis and the elements of the other of said terns comprise second pins arranged in substantially radial direction.

17. The head according to claim 16, wherein each of said first pins is adapted to remain into contact with one of said second pins.

18. The head according to claim 9, wherein said second constraining system comprises at least three struts arranged between the support structure and the movable arm-set.

19. The head according to claim 8, wherein said detecting device is adapted to detect the elimination of said substantially annular mutual contact.

20. The head according to claim 19, wherein said detecting device is responsive to the passage of radiation through said annular surface and said substantially flat surface.

21. The head according to claim 1, wherein said bias device comprises a double-coiled spring.

22. The head according to claim 1, wherein said bias device comprises a compression spring and a torsion spring.

23. The head according to claim 1, wherein said detecting device is adapted to detect disengagement of said first constraining system.

24. The head according to claim 23, wherein said detecting device comprises resistive elements coupled to the movable arm-set and to the support structure, the resistive elements being adapted to enter into substantially annular mutual contact.

25. The head according to claim 23, wherein said detecting device comprises a capacitive circuit between the movable arm-set and the support structure.

26. The head according to claim 1, wherein said bias device comprises a compression spring and three return springs.

27. A head for checking linear dimensions of parts in machine tools or measuring machines, said head comprising:

a support structure;

a movable arm-set including an arm carrying a feeler for contacting the part to be checked;

a bias device arranged between the support structure and the movable arm-set;

a first and a second constraining systems, totally with force closure, arranged between the support structure and the movable arm-set, for eliminating, under the action of the bias device, the six degrees of freedom of the movable arm-set; and a detecting device for providing a signal depending on the position of the movable arm-set, wherein:

the first constraining system has a structure with rotational symmetry about a geometrical axis and includes an annular surface and a substantially flat surface, the two surfaces being biased into substantially annular mutual contact by the force provided by the bias device for eliminating three degrees of freedom of the movable arm-set, relating to the translation along said geometrical axis and rotations about geometrical axes transversal with respect to said geometrical axis; and the second constraining system comprises at least three struts for eliminating the three further degrees of freedom of the movable arm-set relating to the rotation about said geometrical axis and translations along said transversal geometrical axes.

28. A supporting and constraining arrangement for a movable arm-set in a head for checking linear dimensions of parts in machine tools or measuring machines, the arm-set being substantially rigid and including an arm carrying a feeler for contacting the part to be checked, the arrangement comprising a support structure, a bias device arranged between the support structure and the movable arm-set and adapted to apply to the movable arm-set a force along a geometrical axis and a moment of rotation about the same geometrical axis, a first constraining system having a structure with rotational symmetry about said geometrical axis and a second constraining system of a type different from that of the first constraining system, the first and the second constraining systems being arranged between the support structure and the movable arm-set for eliminating, under the action of the bias device, the six degrees of freedom of the movable arm-set, the degrees of freedom eliminated by the first constraining system including the translation of the movable arm-set along said geometrical axis, wherein both the first constraining system and the second constraining system include at least one first portion rigidly connected to the support structure and at least one second portion rigidly connected to the movable arm-set, said at least one first portion and at least one second portion of each constraining system applying, under the action of the bias device, a biasing force towards each other.

29. The supporting and constraining arrangement according to claim 28, wherein said bias device comprises a compression spring and three return springs.

30. A head for checking linear dimensions of parts in machine tools or measuring machines, said head comprising a support structure, a movable arm-set including an arm carrying a feeler for contacting the part to be checked, a bias device arranged between the support structure and the movable arm-set, a first constraining system having a structure with rotational symmetry about a geometrical axis and a second constraining system of a type different from that of the first constraining system, the first and the second constraining systems being arranged between the support structure and the movable arm-set, for eliminating, under the action of the bias device, the six degrees of freedom of the movable arm-set, the first constraining system including an annual surface and a substantially flat surface, the two surfaces being biased into substantially annular mutual contact by the force provided by the bias device for eliminating three degrees of freedom of the movable arm-set relating to the translation along said geometrical axis and rotations about geometrical axes transversal with respect to said geometrical axis, and a detecting device for providing a signal depending on the position of the movable arm-set, wherein the first constraining system and the second constraining system are totally with force closure, said detecting device being responsive to the passage of radiation through said annular surface and said substantially flat surface to detect the elimination of said substantially annular mutual contact.

\* \* \* \* \*